Oct. 24, 1967  D. C. STAFFORD ET AL  3,348,834
ROTATABLE VESSEL FOR HEAT-GENERATING REACTIONS
Filed March 4, 1965  5 Sheets-Sheet 1

Inventors
Donald C. Stafford
Robert S. Chamberlin
By Merriam, Smith & Marshall
Attorneys Oct. 24, 1967  D. C. STAFFORD ETAL  3,348,834
ROTATABLE VESSEL FOR HEAT-GENERATING REACTIONS
Filed March 4, 1965  5 Sheets-Sheet 4

Inventors
Donald C. Stafford
Robert S. Chamberlin
By Morrison, Smith & Marshall
Attorneys Oct. 24, 1967  D. C. STAFFORD ETAL  3,348,834
ROTATABLE VESSEL FOR HEAT-GENERATING REACTIONS
Filed March 4, 1965  5 Sheets-Sheet 5

Inventors
Donald C. Stafford
Robert S. Chamberlin
By Merriam, Smith & Marshall
Attorneys

United States Patent Office 3,348,834
Patented Oct. 24, 1967

3,348,834
ROTATABLE VESSEL FOR HEAT-GENERATING REACTIONS
Donald C. Stafford, Homewood, and Robert S. Chamberlin, Western Springs, Ill., assignors to Chicago Bridge & Iron Company, Oak Brook, Ill., a corporation of Illinois
Filed Mar. 4, 1965, Ser. No. 437,128
18 Claims. (Cl. 266—36)

ABSTRACT OF THE DISCLOSURE

Vertically disposed vessel mounted on and surrounded by trunnion ring rotatably mounted on trunnion pins. Vessel and trunnion ring readily removable from trunnion pins. Structure, at that end of each pin engaging trunnion ring, for accommodating deflection of trunnion ring due to load of vessel.

---

The present invention relates generally to rotatable vessels for heat-generating reactions (e.g., basic oxygen converter vessels) and their mountings. The invention relates more particularly to a normally vertically disposed rotatable vessel which is readily removable from its rotation mountings, and to a vessel having rotation mountings which accommodate vessel deflection, from the axis of rotation, due to the load of the vessel and its contents.

Vessels used in the performance of heat-generating reactions require frequent, periodic maintenance on the vessel interior; and maintenance of this type ordinarily necessitates shutting down the operations which are performed in the vessel. If operations are to continue while maintenance is performed on the interior of one vessel, it is necessary to have a reserve vessel.

Vessels of the general type under consideration generally have associated therewith a substantial amount of other equipment which, among other things, mounts the vessel for rotation and drives the vessel through its sequence of rotation between upright and tilted positions. This mounting and driving equipment generally does not require maintenance during the time the vessel interior is undergoing repair, and to idle this equipment while the vessel is undergoing repair is wasteful and expensive.

In accordance with the present invention, there is provided a vessel and associated mounting and driving equipment which enables ready removal of the vessel from its mounting so as to facilitate replacement of the vessel by a reserve vessel during the time the first vessel is undergoing repair. This permits the use of the same mounting and driving equipment in conjunction with more than one vessel, and minimizes the idle time for the mounting and driving equipment.

Vessels of the general type under consideration are typically surrounded by a trunnion ring on which the vessel is mounted for rotation; and the trunnion ring is generally mounted between a pair of trunnion pins for rotation of the ring about the axis of the pins. One trunnion pin is a drive pin constituting a linkage between a driving motor and the ring. The other trunnion pin may be an idler pin.

In accordance with the present invention, the trunnion ring is removably mounted on the pins, and the idler pin is fixed against rotation in a manner which shifts inwardly, toward the trunnion ring, the location of the bending moment arising from the load of the vessel and its contents. An arrangement of this type reduces the size and strength requirements for the idler trunnion pin, and results in substantial savings.

Other features of the present invention include means, at the inner end portions of the respective trunnion pins, adjacent the trunnion ring, for accommodating the deflection of the trunnion ring (resulting from the load of the vessel and its contents) without interfering with the rotation of the ring about the axis of the trunnion pins.

Other features and advantages are inherent in the structure claimed and disclosed or will become apparent to those skilled in the art from the following detailed description in conjunction with the accompanying diagrammatic drawings wherein:

Figure 4:
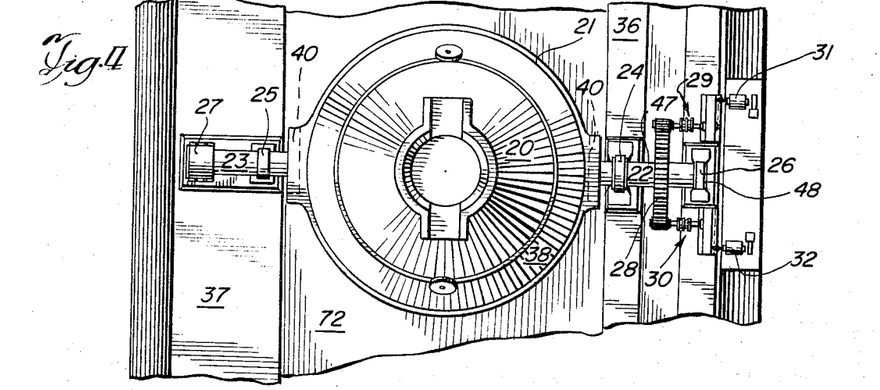
FIGURE 4 is a top plan view of an embodiment of a vessel and its mountings in accordance with the present invention.
Figure 5:
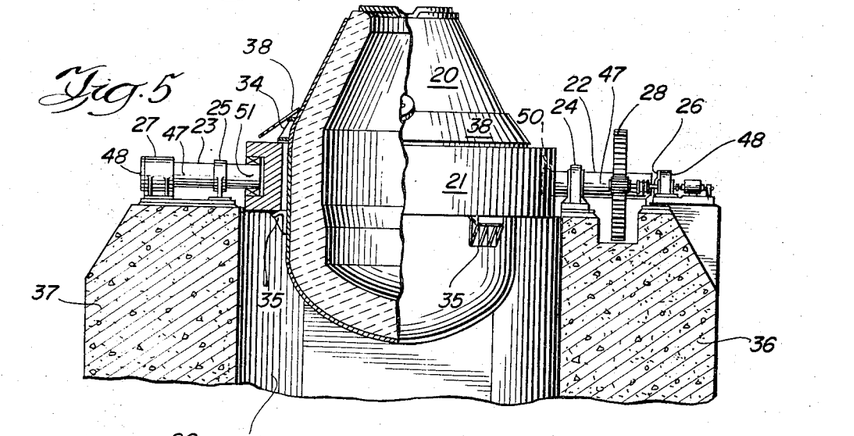
FIGURE 5 is a vertical side view, partially cut away and partially in section, of the vessel and mountings of FIGURE 4.

Referring to FIGURES 4 and 5, trunnion ring 21 is illustrated a normally vertically disposed vessel 20 and a trunnion ring 21 surrounding vessel 20 and radially spaced therefrom. Attached to the exterior of vessel 20 are upper and lower mounting lugs 34, 35, respectively, which cooperate with means on trunnion ring 21 to support vessel 20 on trunnion ring 21 in all positions of rotation of vessel 20. A more detailed description of the mounting of a vessel such as 20 on a trunnion ring such as 21 is given in Johnson U.S. Patent No. 3,191,921.

Referring to FIGURES 4 and 5, trunnion ring 21 is rotatably mounted on a pair of trunnion pins, drive pin 22 and idler pin 23; and the trunnion ring rotates, together with vessel 20, about the axis of trunnion pins 22, 23. Trunnion drive pin 22 is rotatably mounted on a saddle 24 and a yoke 26, while trunnion idler pin 23 is fixedly mounted, relative to its axis, on a yoke 27 and saddle 25. Yoke 26 and saddle 24 are supported on a foundation 36; and yoke 27 and saddle 25 are supported on a foundation 37 which, together with foundation 36, defines a pit 72 therebetween and into which vessel 20 extends.

Mounted on drive pin 22 is a bull gear 28 connected by a pair of driving linkages indicated generally at 29, 30 to a pair of driving motors 31, 32. Motors 31, 32, driving linkages 29, 30 and bull gear 28 drive trunnion pin 22 which engages trunnion ring 21 to rotate it and vessel 20 about the axis of the trunnion pins.

Surrounding a portion of vessel 20, and overlapping upper mounting lugs 34 is a slag shield 38. The construction of a vessel such as 20, and a driving arrangement therefor, are described in greater detail in Mummert U.S. Patent No. 3,195,875.

Referring to FIGURE 5, each trunnion pin 22, 23 has a respective first or inner end portion 50, 51 located adjacent vessel 20. Each trunnion pin also includes a second end portion 48 (FIG. 5) remote from the vessel, and a middle portion 47 extending from the first end portion to the second end portion of the trunnion pin.

The trunnion ring and the vessel (by virtue of its supported relationship with the trunnion ring) are mounted on the first end portions of the trunnion pins, for sliding removal of the trunnion ring and vessel from the trunnion pins, in a horizontal direction transverse to the axis of the pins, with the vessel remaining in its normal vertical disposition. The structure involved in this mounting arrangement will now be described in detail.

Referring to FIGURES 1–3 and 10, trunnion ring 21 includes a pair of means, each defining a respective recess 40, with each recess 40 being at a location diametrically opposed to the location of the other recess.

Each recess 40 has a closed inner end 45 adjacent vessel 20, and an open outer end 46 opposite closed end 45. Each recess also has closed upper and lower sides 41, 42, a closed vertical side 43 and a side opening 44 opposite vertical side 43. The side openings 44 of each of the trunnion ring recesses 40 face the same direction, which would be toward the top of the page in the view of FIGURE 4.

Located at the first or inner end portion of a trunnion pin is recess-engaging means in the form of a cartridge 52 (FIG. 2) receivable through recess side opening 44 and receivable within recess 40. Located within recess 40, adjacent vertical side 43 are wedge means 65, 68 each for engaging a part of cartridge 52. Also located within recess 40, adjacent side opening 44 therein, are removable wedge means 66, 67 each for engaging another part of cartridge 52 and for at least partially closing side opening 44 to prevent removal of the recess from around cartridge 52. Cartridge 52 and the cartridge-engaging wedge means 65–68 within recess 40 include engaging means cooperating to mount the trunnion ring for rotation about the axis of the pins, and this structure will now be described in detail.

Figure 10:
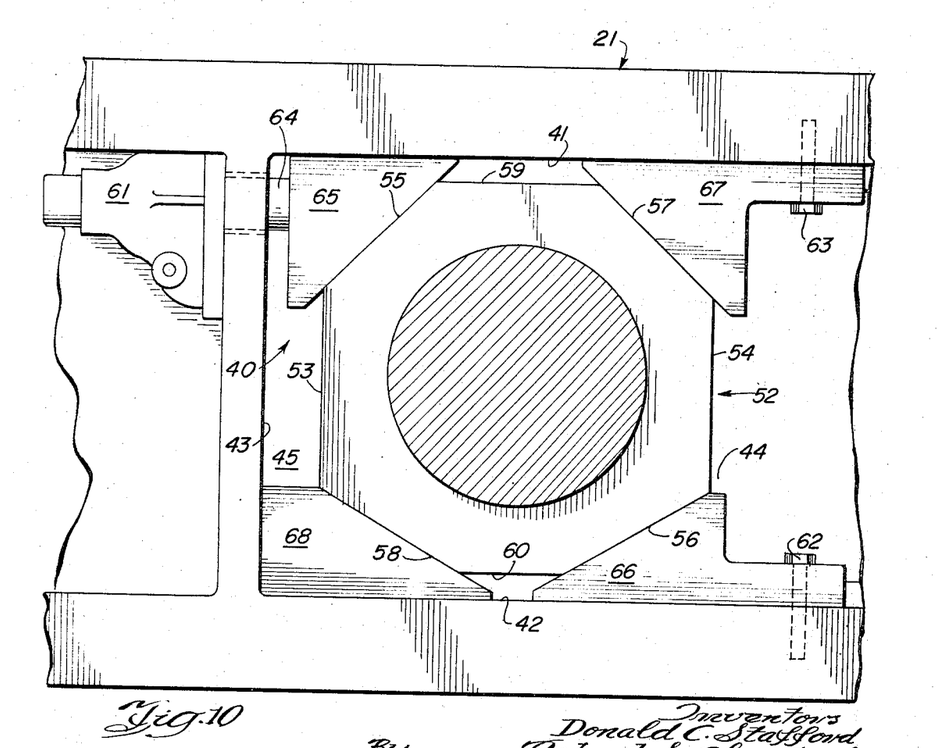
FIGURE 10 is an end view, partially in section, of a removable mounting of a trunnion ring on a trunnion pin.

Referring to FIGURE 10, cartridge 52 has a polygonal cross-section with four pairs of diametrically opposed sides. At least two of these pairs each has an upper side and a lower side. More specifically, cartridge 52 includes a first pair of diametrically opposed engaging sides or surfaces 55, 56, a second pair of diametrically opposed engaging surfaces 57, 58, upper and lower surfaces 59, 60, respectively, and side surfaces 53, 54, respectively.

As previously indicated, located within recess 40, adjacent vertical side 43, are a pair of wedge means comprising an upper wedge 65 engageable with upper surface 55 of cartridge 52 and a lower wedge 68 engageable with lower surface 58 of cartridge 52. Removably mounted within recess 40 adjacent open side 44 thereof is a pair of wedge means comprising an upper wedge 67 removably attached to recess upper end 41 by a bolt 63 and engageable with upper surface 57 of cartridge 52, and a lower wedge 66 removably mounted to lower side 42 of recess 40 by bolt 62 and engageable with lower surface 56 of cartridge 52.

Each of cartridge sides 55, 56, 57, 58 has the same slope as the corresponding wedges 65, 66, 67, 68 with which the cartridge side is engaged. Each of the upper wedges 65, 67 has the same downward slope, in respective opposite directions. That is, the downward slope of wedge 65, to the left as viewed in FIGURE 10, is the same as the downward slope of wedge 67, to the right as viewed in FIGURE 10. Typically, wedges 65 and 67 would each have a slope of 45°, relative to upper side 41 of recess 40.

Wedge 68 has an upward slope, relative to recess lower side 42, no greater than the downward slope of upper wedges 65, 67. For example, the upward slope of wedge 68 could be 30°. The upward slope of wedge 66, relative to recess lower side 42, may be the same as that of wedge 68.

In the illustrated embodiment, wedge 65 is mounted on a jack rod 64 for horizontal movement toward and away from open side 44 of recess 40 in response to actuation of a jack 61.

The manner in which recess 40 is removed from around cartridge 52 will now be described in detail. The description will be with relation to a recess on one side of the trunnion ring, but the same thing will also be happening with relation to the recess on the other side.

Jack 61 is actuated to move wedge 65 away from cartridge 58; that is, in a direction to the left as viewed in FIGURE 10. When this occurs, the weight of the vessel and the trunnion ring causes them and attached upper wedge 67 to slide downwardly and to the right relative to side 57 of cartridge 52. As a result of this sliding movement, movable wedge 65 remains in continuous contact with side 55 of cartridge 52. The result of all this movement is to open up a gap between cartridge side 56 and lower wedge 66, thereby removing the weight of the vessel and trunnion ring from off of wedge 66. It is then a simple matter to withdraw wedge 66 from recess 40 merely by removing bolt 62 and sliding wedge 66 outwardly through recess open side 44 (to the right as viewed in FIGURE 10).

The next step is to remove bolt 63 holding upper wedge 67 to recess upper side 41, and wedge 67 can then be withdrawn merely by sliding it outwardly through open side 44 (to the right as viewed in FIGURE 10). To withdraw wedge 67, it may be necessary to raise the vessel and trunnion ring, by means to be subsequently described, to loosen the engagement of wedge 67 between side 57 of cartridge 52 and the upper side 41 of recess 40.

Once wedges 66, 67 have been removed from recess 40, it is a simple matter to disengage recess 40 from around cartridge 52. All that is necessary is merely to move recess 40 to the left, as viewed in FIGURE 10, relative to cartridge 52. Because each trunnion ring recess 40 has an open side facing in the same direction, moving the vessel and trunnion ring in a horizontal direction, to the left as viewed in FIGURE 10, would result in the simultaneous removal of both trunnion ring recesses from around their respective cartridges.

To reinstall recess 40 around cartridge 52, one need merely reverse the procedure described above for removing the recess from around the cartridge.

In the embodiment illustrated in FIGURE 10, lower wedge 68 is shown as a separate, discrete element relative to the sides 43, 42 of trunnion recess 40. In other embodiments, wedge 68 may be integral with the sides 43, 42 of recess 40, or wedge 68 may be movably mounted in the same manner as upper wedge 65 is mounted.

Figure 1:
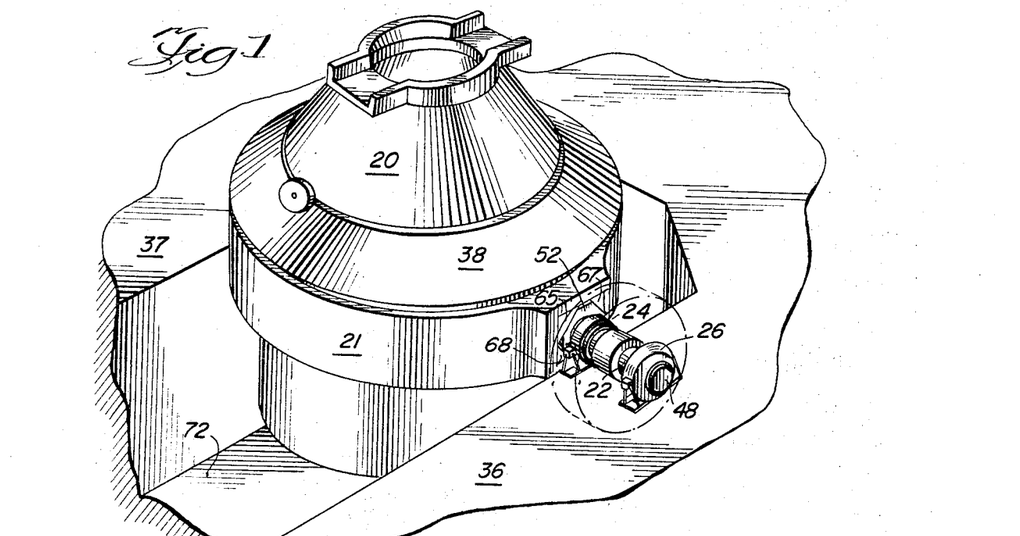
FIGURE 1 is a perspective view illustrating an embodiment of a vessel and its mounting in accordance with the present invention.
Figure 2:
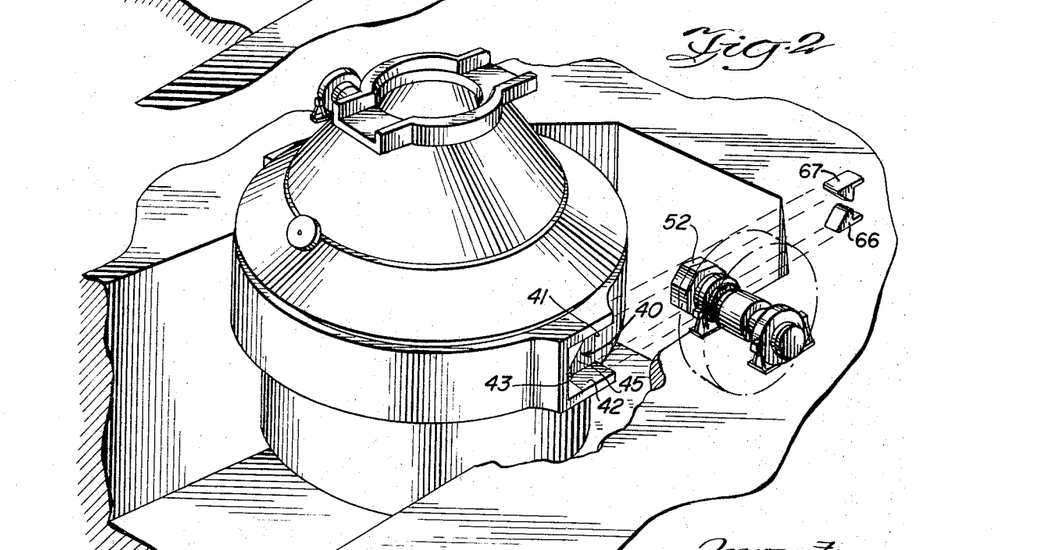
FIGURE 2 is an exploded perspective view of the subject matter of FIGURE 1.
Figure 3:
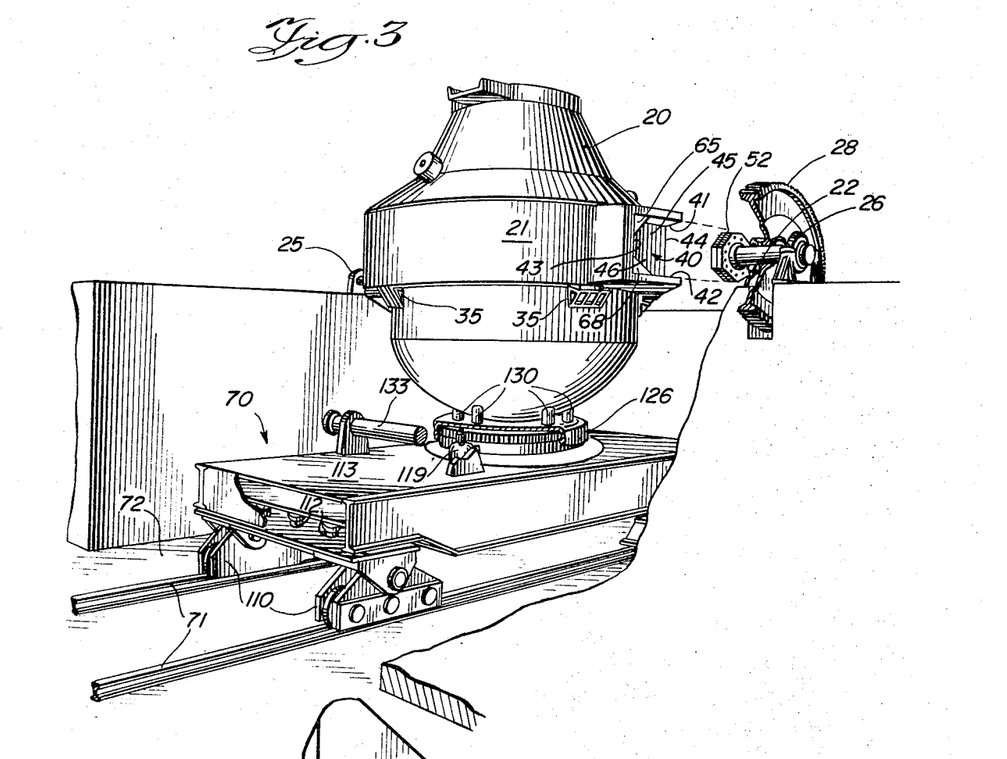
FIGURE 3 is a perspective view of the vessel removed from its mountings and supported by a vessel car.

Referring to FIGURE 3, a convenient way of moving trunnion ring recess 40 horizontally relative to cartridge 52 is to mount the vessel on a car 72 movable along rails 71 located at the bottom of pit 72 within which vessel 20 extends.

It should be apparent from the preceding description that polygonal cartridges 52 are engaged by the wedges within the trunnion ring recesses 40 so that the cartridges are rotatable together with the trunnion ring and vice versa. Located within the cartridge on drive pin 22 is means for rotating the cartridge with the drive pin. Located within the cartridge on the idler pin 23 is means mounting the cartridge for rotation relative to the idler pin.

Because of the load of the vessel and its contents, there will be a deflection of vessel 20 and trunnion ring 21 relative to the axis of the trunnion pins 22, 23; and the structure within cartridges 52 mounting the cartridges on their respective trunnion pins 22, 23 include structure for accommodating this deflection in addition to including structure for driving and rotatably mounting the trunnion ring.

Deflection of the vessel and trunnion ring will vary according to the load within vessel 20, and the structure within the cartridges will adjust to this change in relative deflection. The various means within the cartridges will now be described in detail, the structure associated with drive pin 22 being described first.

Figure 6:
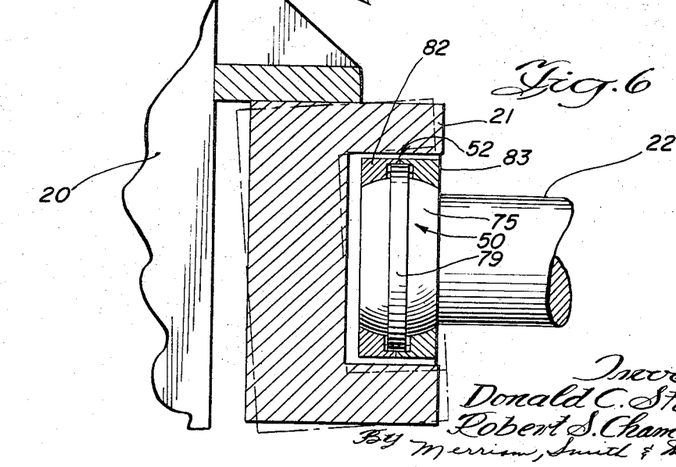
FIGURE 6 is an enlarged fragmentary view, partially in section, illustrating the mounting of the vessel and its trunnion ring on a trunnion drive pin.
Figure 7:
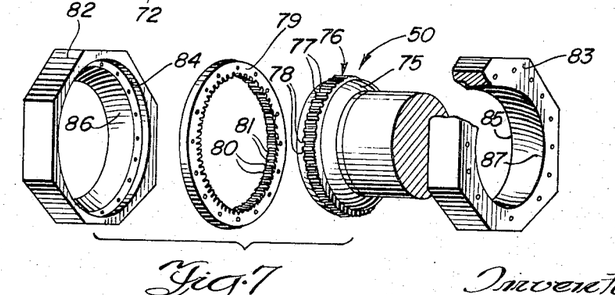
FIGURE 7 is an exploded perspective view of a portion of the trunnion drive pin and associated elements.
Figure 8:
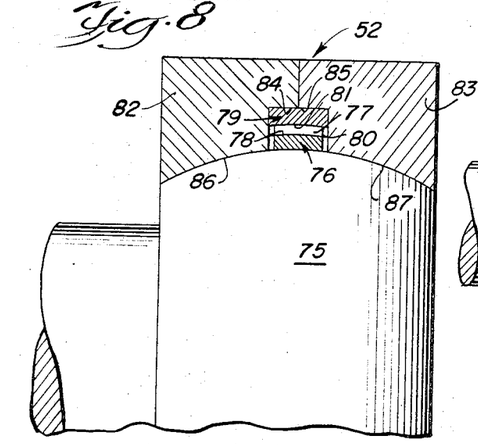
FIGURE 8 is an enlarged, fragmentary, vertical sectional view showing an assembly of the exploded components of FIGURE 7.

Referring to FIGURES 6-8, located at the first end portion 50 of drive pin 22 is a ball or spherical means 75, and extending around the periphery of ball 75, at the middle thereof, is a first or exterior ring gear 76 integral or movable with ball 75. First ring gear 76 is engaged by a second or interior ring gear 79 surrounding first ring gear 76; and second ring gear 79 is received within respective inner recess portions 84, 85 of a pair of cartridge halves 82, 83, respectively. Each cartridge half 82, 83 has an inner curved or spherical surface 86, 87, respectively, cooperating to define a socket for ball 75.

Referring to FIGURE 8, first ring gear 76 has a plurality of teeth 77 and a plurality of grooves or valleys 78 located between teeth 77, and the teeth 77 and grooves 78 have convex surfaces curved in the direction of the pin axis for engaging the second ring gear 79. The second ring gear 79 has teeth 80, and grooves or valleys 81 each located between a pair of teeth 80, and the teeth 80 and grooves 81 of second ring gear 79 have concave surfaces, curved in the direction of the pin axis, for engaging the first ring gear.

Referring to FIGURE 6, depending upon the load of vessel 20 and its contents, the vessel and trunnion ring 21 will undergo various amounts of deflection, with the deflection changing with changes in the load. Changes in the deflection of the trunnion ring are illustrated by the full lines and by the dash-dot lines in FIGURE 6. The dash-dot lines represent increased deflection relative to the deflection represented by the full lines in FIGURE 6. With increased deflection of trunnion ring 21, the socket defined by the inner surfaces 86, 87 of cartridge halves 82, 83 will be urged to slide counterclockwise and slightly to the left relative to the engaging surface of ball 75 (FIG. 8); and the teeth 80 and grooves 81 of second ring gear 79 will be urged to slide counterclockwise and slightly to the left, as viewed in FIGURE 8, relative to the engaging grooves 78 and teeth 77 of first ring gear 76.

By providing a ball and socket arrangement, as illustrated in FIGURES 6-8, and by providing the teeth and grooves of the two ring gears 76, 79 with curved surfaces, as illustrated in FIGURES 6-8, deflection of the trunnion ring will be accommodated by movement of the cartridge halves 82, 83 and second ring gear 79 relative to ball 75 and first ring gear 76, respectively, both of the latter being fixed on trunnion pin 22. At the same time, the engagement of first ring gear 76 with second ring gear 79 enables rotation of the trunnion ring and vessel together with drive pin 22.

Figure 9:
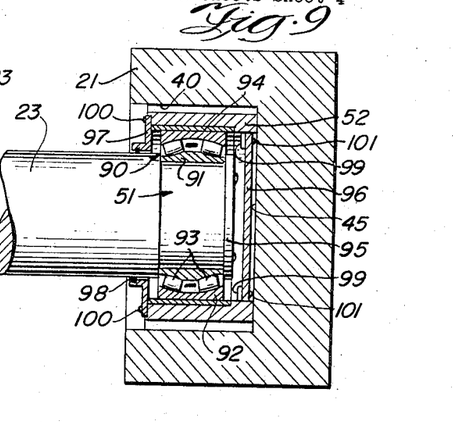
FIGURE 9 is a vertical sectional view illustrating the mounting of a vessel trunnion ring on a trunnion idler pin.

As previously indicated, idler pin 23 is fixed against rotation about its axis; and cartridge 52 is mounted on idler pin 23 for rotation of the cartridge relative to the idler pin. Referring to FIGURE 9, at the first or inner end portion 51 of trunnion idler pin 23 is a spherical roller bearing indicated generally at 90. Because idler pin 23 is fixed rather than rotatable with trunnion ring 21, the bending moment of pin 23 is at the first or inner end portion 51 of the pin, within recess 40, rather than at some location to the left of end portion 51, as viewed in FIGURE 9. This reduces the bending moment on pin 23 and reduces the strength and size requirements for the pin.

23 and reduces the strength and size requirements for immovably mounted on pin 23 and having a convex outer surface. Bearing 90 also includes an outer race 94, having a concave inner surface, and a plurality of rollers 93 located between the inner and outer races 91, 92. The curvature of inner and outer races 91, 92 is in the direction of the axis of pin 23. In surrounding engagement with outer race 92 is a nodular iron ring 94 which has a width greater than the width of outer race 92, as illustrated in FIGURE 9. An end plate 95 is attached to the innermost extremity of the trunnion pin's inner end portion 51. Ring 94 is located within cartridge 52 and is rotatable therewith. In addition, outer race 92 is rotatable with nodular iron ring 94 and cartridge 52, all of the latter being rotatable with trunnion ring 21. Nodular iron ring 94 is slidable, in the direction of the axis of pin 23, relative to outer race 92; and the spacing between the end plate 95 on first end portion 51 of pin 23 and the inner end 45 of trunnion ring recess 40, is sufficient to accommodate thermal expansion of the trunnion ring in a radial direction. When the trunnion ring expands in a radial direction, trunnion ring 21, cartridge 52 and nodular iron ring 94 move in a direction which would be to the left, as viewed in FIGURE 9. Trunnion idler pin 23, being fixed and immovable relative to trunnion ring 21, remains stationary, as does spherical roller bearing 90 on pin 23. The sliding of nodular iron ring 94 on outer race 92 of bearing 90, accommodates the radial expansion of the trunnion ring, as does the space between the end plate 95 on trunnion pin 23 and the inner end 45 of recess 40.

In the embodiment illustrated in FIGURE 9, cartridge 52 includes a plurality of ears 99 extending inwardly from the cartridge, and secured to ears 99 by screws 101 is a cartridge inner end plate 96. Cartridge inner end plate 96 may be considered, in the embodiment of FIGURE 9, as though it were the inner end of recess 40, for purposes of defining the space between the inner end plate 95 of trunnion pin 23 and the inner end of the recess. Thus, it would be the space between plates 95 and 96 which accommodates radial expansion on the part of the trunnion ring, in the embodiment of FIGURE 9. Fixed to cartridge 52, at an end thereof opposite cartridge inner end plate 96 is a cartridge ring plate 97, attached to the cartridge by screws 100; and located between ring plate 97 and pin 23 is a seal 98.

By providing a spherical roller bearing of the type illustrated in FIGURE 9, in conjunction with the associated apparatus illustrated in FIGURE 9, deflection of the trunnion ring due to the load of the vessel and the contents thereof is accommodated while at the same time mounting the trunnion ring for rotation relative to the fixed pin 23.

Figure 11:
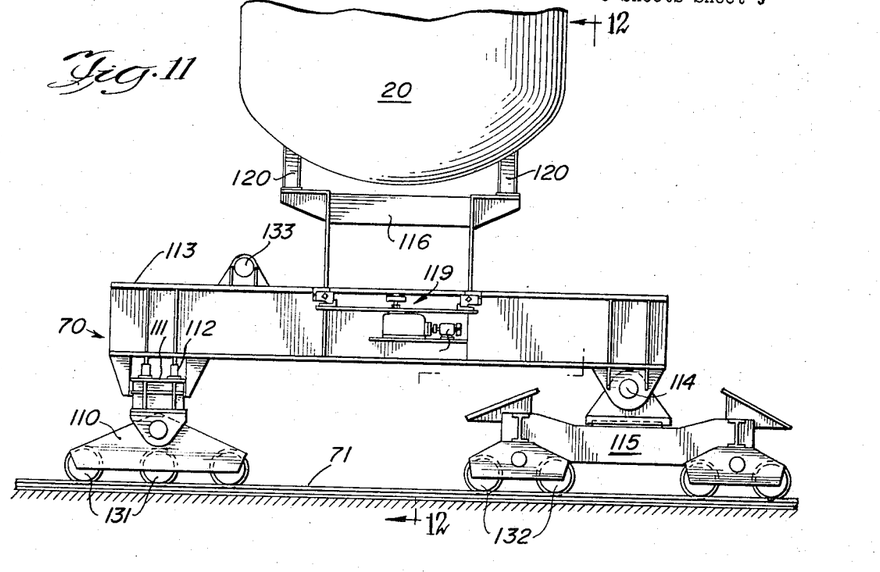
FIGURE 11 is a side elevational view of a vessel on a car for moving the vessel into or out of mounting engagement with its trunnion pins.
Figure 12:
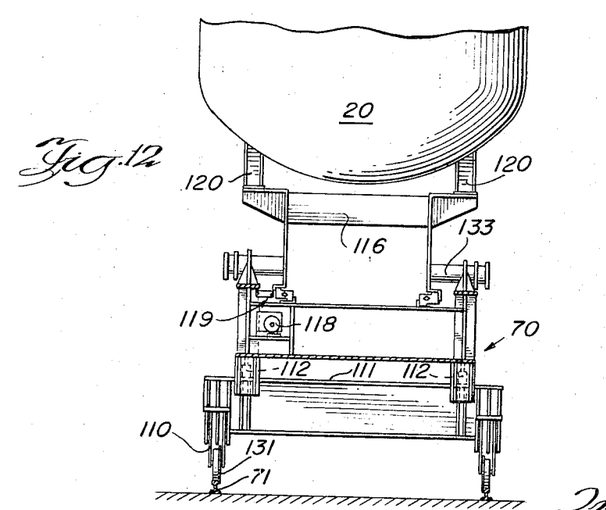
FIGURE 12 is a sectional view taken along lines 12—12 in FIGURE 11.

FIGURES 11 and 12 illustrate an embodiment of a vessel support car for removing the vessel from its mountings on the trunnion pins 22, 23. The car includes a front truck 110 upon which is supported a front platform 111 upon which are mounted a plurality of jacks 112 supporting the front end of bridge means 113 having a rear end pivotally mounted about the axis of a swivel 114 mounted on rear trucks 115. Located below the top of bridge means 113 is an arrangement, including a motor 118 and a linkage indicated generally at 119, for rotating a turntable 116 upon which are supported a plurality of posts or legs 120 extending downwardly from vessel 20. In the embodiment of car illustrated in FIGURE 3, there is shown another type of turntable 126 which is relatively low compared to the elevation of the turntable 116 in FIGURE 11.

To elevate or lower vessel 20, for purposes of removing or installing the wedges in trunnion ring recesses 40, jacks 112 are elevated or lowered, and this causes pivotal movement of bridge means 113 about the axis of swivel 114, in turn elevating or lowering turntable 116, vessel legs 120 and vessel 20.

In the embodiment of FIGURE 11, the legs 120 are constructed of rolled structural shapes such as I beams. In the embodiment illustrated in FIGURE 3, the vessel has legs 130 which are tubular in cross-section.

Front truck 110 of car 70 includes wheels 131 which ride on rails 71; and rear truck 115 of car 70 includes wheels 132 which ride on rails 71. Located atop bridge means 113 near the front end thereof is a lift lug 133, for accommodating hooks depending from overhead cranes. The foregoing detailed description has been given for clearness of understanding only, and no unnecessary limitations should be understood therefrom, as modifications will be obvious to those skilled in the art.

What is claimed is:

1. In combination:
a normally vertically disposed vessel;
a pair of horizontally disposed trunnion pins having a common axis;
and means mounting said vessel on said pins, between the pins, for rotation of the vessel about the axis of said pins;
said mounting means including means mounting the vessel for sliding removal, from its mounting on said pins, in a horizontal direction transverse to the axis of said pins, with the vessel in its normal vertical disposition, to separate the vessel from the pins.

2. In combination:
a normally vertically disposed vessel;
a trunnion ring surrounding said vessel and radially spaced therefrom;
means on said vessel and on said trunnion ring cooperating to mount the vessel on the trunnion ring;
a pair of horizontally disposed trunnion pins on diametrically opposite sides of said trunnion ring, said pins having a common axis;
and means removably mounting said trunnion ring on said pins for rotation of the trunnion ring and vessel about the axis of said pins and for separating the trunnion ring and vessel from the pins.

3. In the combination of claim 2;
driving means for rotating one of said pins;
means on said one pin and on said trunnion ring cooperating to rotate the trunning ring with the one pin;
means fixing the other of said pins against rotation about its axis;
and means on said other pin and on said trunnion ring cooperating to mount the trunnion ring for rotation, relative to the other pin, about the axis of the other pin.

4. In the combination of claim 2 wherein said removable mounting means comprises:
means mounting the trunnion ring for sliding removal, from its mounting on said pins, in a horizontal direction transverse to the axis of said pins, with the vessel in its normal vertical disposition, to separate the trunnion ring and the vessel from the pins.

5. In the combination of claim 2:
each of said pins having a first end portion located adjacent said vessel;
means at said first end portion of each of the pins for supporting the trunnion ring between the pins;
a pair of saddle means for said pins, each of said saddle means being located adjacent said first end portion of a respective one of the pins;
a pair of yoke means for said pins, each of said yoke means being axially spaced from a respective one of said saddle means;
said supporting means for the trunnion ring including means for accommodating deflection of the trunnion ring and vessel, relative to the axis of said pins, due to the load of the vessel and ring.

6. In the combination of claim 2:
each of said pins having a first end portion located adjacent said vessel;
means at said first end portion of the pins for supporting the trunnion ring between the pins;
driving means for rotating one of said pins;
said trunnion ring supporting means on said one pin comprising ball means rotatable with said pin;
socket means, rotatable with said trunnion ring, receiving said ball means;
first ring gear means rotatable with and on said ball means;
second ring gear means in said socket means and rotatable therewith;
said second ring gear means surrounding said first ring gear means and including means for engaging said first ring gear means for rotation of the socket means and trunnion ring with said one pin.

7. In the combination of claim 6 wherein:
the teeth on said first ring gear means and the grooves between said teeth have convex surfaces, curved in the direction of the pin axis, for engaging said second ring gear means;
and the teeth on said second ring gear means and the grooves between said teeth have concave surfaces, curved in the direction of the pin axis, for engaging said first ring gear means.

8. In the combination of claim 2:
each of said pins having a first end portion located adjacent said vessel;
means at said first end portions of the pins for supporting the trunnion ring between the pins;
means fixing a first of said pins against rotation about its axis;
said trunnion ring supporting means on said first pin including a spherical roller bearing at the first end portion of said first pin;
said spherical roller bearing including an inner race on said pin and immovable therewith, said inner race having a convex outer surface, curved in the direction of the pin axis;
said spherical roller bearing including an outer race having a concave inner surface, curved in the direction of the pin axis;
roller means between said inner and outer races;
and means engaging said outer race to said trunnion ring for rotation of the outer race with the trunnion ring.

9. In the combination of claim 8:
a nodular iron ring, in axially slidable engagement with said outer race, around the outside of the latter;
means mounting said nodular iron ring to the trunnion ring and holding the nodular iron ring against movement relative to the trunnion ring;
and means movable with said trunnion ring and means at the first end portion of the first pin cooperating to define a space for accommodating radial expansion of the trunnion ring relative to the first pin.

10. In combination:
a normally vertically disposed vessel;
a trunnion ring surrounding said vessel and radially spaced therefrom;
means on said vessel and on said trunnion ring cooperating to mount the vessel on the trunnion ring;
a pair of horizontally disposed trunnion pins on diametrically opposite sides of said trunnion ring, said pins having a common axis;
means mounting said trunnion ring on said pins for rotation of the trunnion ring and vessel about the axis of said pins;
each of said pins having a first end portion located adjacent said vessel;
means at said first end portions of the pins for supporting the trunnion ring between the pins;
driving means for rotating one of said pins;
said trunnion ring supporting means on said one pin comprising ball means rotatable with said pin;
socket means, rotatable with said trunnion ring, receiving said ball means;
first ring gear means rotatable with and on said ball means;
second ring gear means in said socket means and rotatable therewith;
said second ring gear means surrounding said first ring gear means and including means for engaging said first ring gear means for rotation of the socket means and trunnion ring with said one pin.

11. In the combination of claim 10 wherein:
the teeth on said first ring gear means and the grooves between said teeth have convex surfaces, curved in the direction of the pin axis, for engaging said second ring gear means;
and the teeth on said second ring gear means and the grooves between said teeth have concave surfaces, curved in the direction of the pin axis, for engaging said first ring gear means.

12. In combination:
a normally vertically disposed vessel;
a trunnion ring surrounding said vessel and radially spaced therefrom;
means on said vessel and on said trunnion ring cooperating to mount the vessel on the trunnion ring;
a pair of horizontally disposed trunnion pins on diametrically opposite sides of said trunnion ring, said pins having a common axis;
means mounting said trunnion ring on said pins for rotation of the trunnion ring and vessel about the axis of said pins;
each of said pins having a first end portion located adjacent said vessel;
means at said first end portions of the pins for supporting the trunnion ring between the pins;
means fixing a first of said pins against rotation about its axis;
said trunnion ring supporting means on said first pin including a spherical roller bearing at the first end portion of said first pin;
said spherical roller bearing including an inner race on said pin and immovable therewith, said inner race having a convex outer surface, curved in the direction of the pin axis;
said spherical roller bearing including an outer race having a concave inner surface, curved in the direction of the pin axis;
roller means between said inner and outer races;
and means engaging said outer race to said trunnion ring for rotation of the outer race with the trunnion ring.

13. In the combination of claim 12:
a nodular iron ring, in axially slidable engagement with said outer race, around the outside of the latter;
means mounting said nodular iron ring to the trunnion ring and holding the nodular iron ring against movement relative to the trunnion ring;
and means movable with said trunnion ring and means at the first end portion of the first pin cooperating to define a space for accommodating radial expansion of the trunnion ring relative to the first pin.

14. In combination:
a normally vertically disposed vessel;
a trunnion ring surrounding said vessel and radially spaced therefrom;
means on said vessel and on said trunnion ring cooperating to mount the vessel on the trunnion ring;
a pair of horizontally disposed trunnion pins on diametrically opposite sides of said trunnion ring, said pins having a common axis;
a pair of means on said trunnion ring each defining a respective recess at a location diametrically opposed to the other recess;
each recess having a closed inner end adjacent the vessel and an open outer end opposite said closed end;
each recess having closed upper and lower sides, a closed side between said upper and lower sides, and a side opening opposite said closed side;
both of said recess side openings facing in the same direction;
each of said pins having an end portion located adjacent a respective recess and recess-engaging means at said end portion;
each recess side opening including means for receiving therethrough a respective one of said recess-engaging means on a pin end portion;
each recess including means for receiving therewithin a respective one of said recess-engaging means on a pin end portion;
first means in each recess, adjacent said closed side thereof, for engaging a part of the recess-engaging means;
and removable second means, adjacent the side opening in each recess, for engaging another part of the recess-engaging means and for at least partially closing said side opening to prevent removal of the recess from around the recess-engaging means;
said recess-engaging means, said first means and said removable second means including means cooperating to mount the trunnion ring for rotation about the axis of said pins.

15. In combination, a trunnion ring and a pin;
means on said trunnion ring defining a recess;
said recess having a closed inner end and an open outer end opposite said closed end;
said recess having closed upper and lower sides, a closed side between said upper and lower sides, and a side opening opposite said closed side;
said pin having an end portion located adjacent the recess and recess-engaging means at said end portion;
said recess side opening including means for receiving therethrough said recess-engaging means on the pin end portion;
said recess including means for receiving therewithin said recess-engaging means on the pin end portion;
first means in the recess, adjacent said closed side thereof, for engaging a part of the recess-engaging means;
and removable second means, adjacent the side opening in the recess, for engaging another part of the recess-engaging means and for at least partially closing said side opening to prevent removal of the recess from around the recess-engaging means;
said recess-engaging means, said first means and said removable second means including means cooperating to mount the trunnion ring for rotation about the axis of said pin.

16. In the combination of claim 15 wherein:
said recess-engaging means has a polygonal cross-section with at least two pairs of diametrically opposed sides, each pair having an upper side and a lower side;
said first means in the recess includes a pair of wedge means comprising an upper wedge means engageable with the upper side of one pair of sides of the recess-engaging means and a lower wedge means engageable with the lower side of the other pair of sides of the recess-engaging means;
said removable second means in the recess includes a pair of removable wedge means comprising an upper removable wedge means engageable with the upper side of said other pair of sides of the recess-engaging means and a lower removable wedge means engageable with the lower side of said one pair of sides of the recess-engaging means;
each of said sides of the recess-engaging means has the same slope as the wedge means engageable therewith;
each of said upper wedge means has the same downward slope, in respective opposite directions;
the lower of said first pair of wedge means has an upward slope, no greater than the downward slope of the upper wedge means;
and means mounting the upper wedge means of the first-recited pair of wedge means for horizontal movement toward and away from said side opening of the recess.

17. In the combination of claim 16 wherein:
each of said lower wedge means has the same upward slope, in respective opposite directions;
and the upward slope of the lower wedge means is less than the downward slope of the upper wedge means.

18. In combination:
a trunnion ring;
a pin;
means fixing said pin against rotation about its axis;
means on said trunnion ring defining a recess;
said pin having an end portion located within said recess and recess-engaging means at said end portion;
means within the recess for engaging said recess engaging means;
said recess-engaging means and said means within the recess including means cooperating to mount the trunnion ring for rotation about the axis of said pin; the only structure which is rotatable about the axis of said pin and which is in contact with said pin consisting of structure located within said recess.

References Cited

UNITED STATES PATENTS

| | | | |
|---|---|---|---|
| 2,444,461 | 7/1948 | Morey et al. | 248—142 |
| 2,976,090 | 3/1961 | McFeathers | 266—36 X |
| 3,195,875 | 7/1965 | Mummert | 266—36 |
| 3,207,002 | 9/1965 | Lakin et al. | 266—36 X |

J. SPENCER OVERHOLSER, *Primary Examiner.*

E. MAR, *Assistant Examiner.*

UNITED STATES PATENT OFFICE

CERTIFICATE OF CORRECTION

Patent No. 3,348,834            October 24, 1967

Donald C. Stafford et al.

It is hereby certified that error appears in the above numbered patent requiring correction and that the said Letters Patent should read as corrected below.

Column 2, line 41, strike out "Referring to FIGURES 4 and 5, trunnion ring 21" and insert instead -- Referring initially to FIGURES 1 through 5, there --; column 4, line 14, for "58" read -- 52 --; column 5, line 70, strike out "23 and reduces the strength and size requirements for" and insert instead -- Spherical roller bearing 90 includes an inner race 91 --; column 7, line 36, for "trunning" read -- trunnion --.

Signed and sealed this 12th day of November 1968.

(SEAL)
Attest:

Edward M. Fletcher, Jr.            EDWARD J. BRENNER
Attesting Officer            Commissioner of Patents